Sept. 15, 1936.  A. WEISENBURG  2,054,210
CLUTCH PLATE
Filed May 22, 1933  3 Sheets-Sheet 1
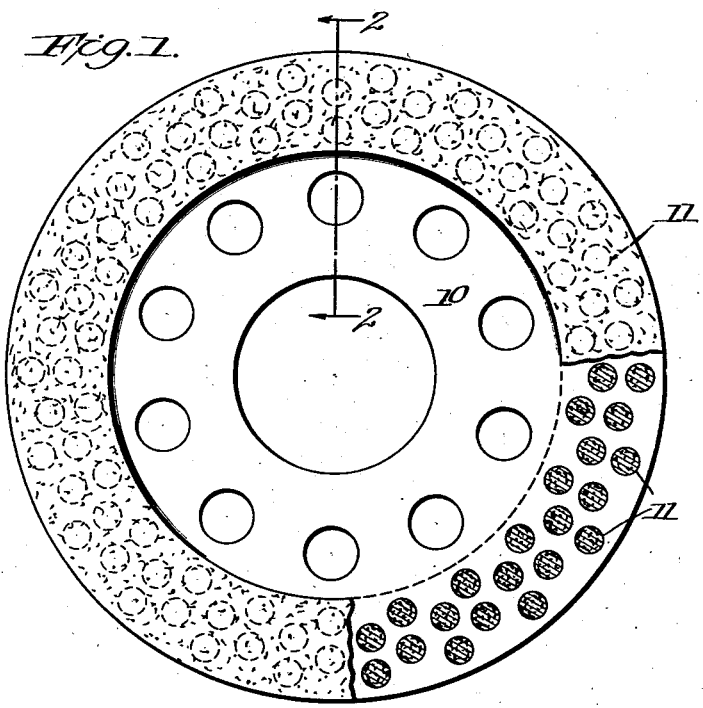
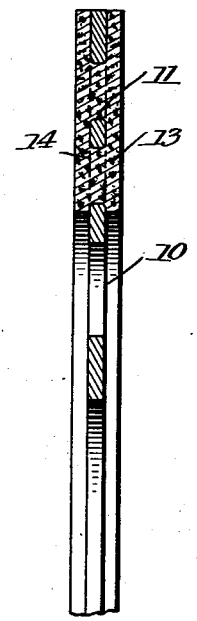
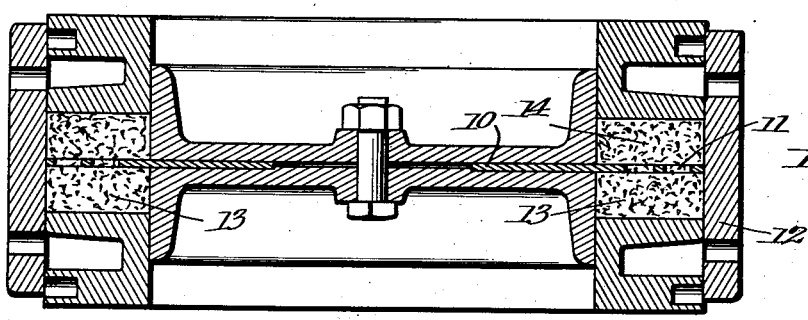
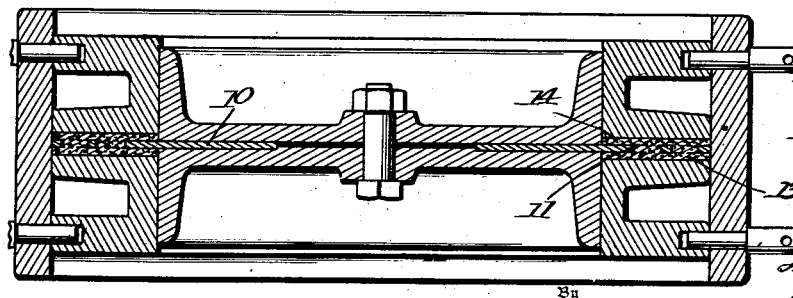
Inventor
Andrew Weisenburg.
Cushman Darby & Cushman
Attorneys Sept. 15, 1936.                A. WEISENBURG                 2,054,210
                                 CLUTCH PLATE
                               Filed May 22, 1933              3 Sheets-Sheet 2
Fig. 5.
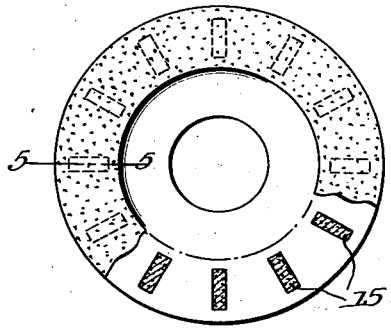
Fig. 7.
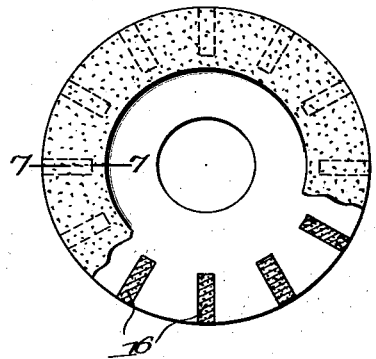
Fig. 6.
Fig. 8.
Fig. 9.
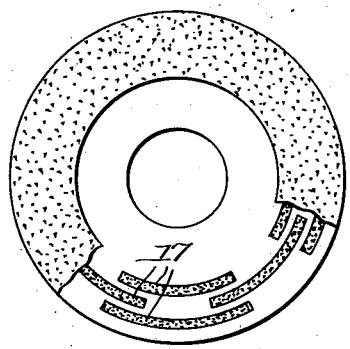
Fig. 10.
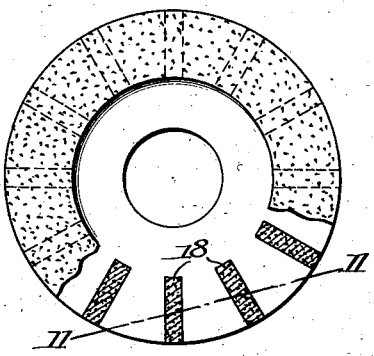
Fig. 12.
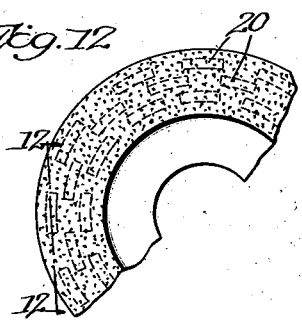
Fig. 13.
Fig. 11.
Inventor
Andrew Weisenburg
By Cushman Darby and Cushman
Attorneys

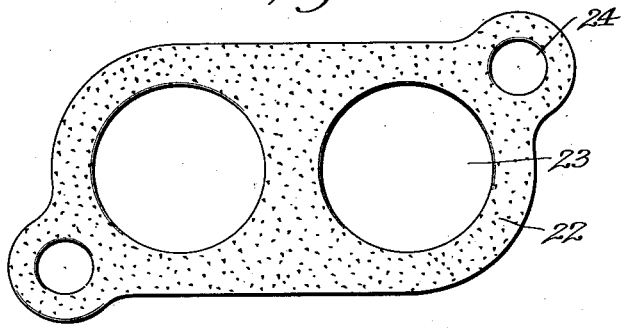
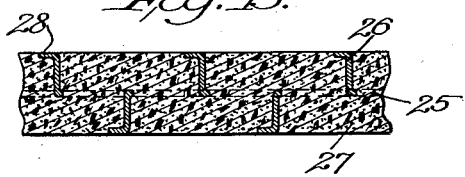 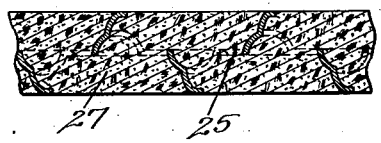
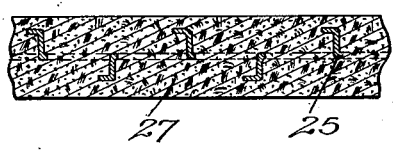 

Patented Sept. 15, 1936

2,054,210

UNITED STATES PATENT OFFICE 2,054,210

CLUTCH PLATE

Andrew Weisenburg, Baltimore, Md., assignor to Crown Cork & Seal Company, Inc., Baltimore, Md., a corporation of New York Application May 22, 1933, Serial No. 672,309

1 Claim. (Cl. 192—107)

The present invention relates to composite clutch plates having a metal core and composition facings and may, with equal facility, be used for the manufacture of gaskets.

The primary object of the invention is to provide a facing material possessing resilience, flexibility and a high frictional and sealing value.

In clutch facings, whether the clutch is a dry clutch or one which runs in the usual motor oil mixtures thereof, a very high temperature is developed and the present invention provides a facing which not only will be resistant to such high temperatures, but will not be subject to any solvent action.

I propose to form the improved facing material of a granulated cork composition which has been prepared as described in my pending applications Serial Nos. 497,615 and 497,616, of which this application is a continuation in part.

The cork composition which I employ, and which is particularly useful for clutch facings and gaskets, includes a synthetic resin and a solvent therefor, which solvent is also a plasticizer for the cork composition. This is of particular advantage in that it enables a composition to be employed which is adhesive, flexible, resilient, water, gas and oil resistant, and which will not disintegrate under the action of heat and pressure.

Referring to the drawings,

Figure 1 is a view of a clutch plate, partly broken away.

Figure 2 is a sectional view on the line 2—2 of Figure 1.

Figures 3 and 4 are sectional views of a mold showing one method of forming a clutch plate or facing.

Figure 5 is a modified type of clutch plate.

Figure 6 is a sectional view on line 5—5 of Figure 5.

Figure 7 is another modified type of clutch plate.

Figure 8 is a sectional view taken on line 7—7 of Figure 7.

Figure 9 is a view of another modified form of clutch plate.

Figure 10 is a further modified form of clutch plate.

Figure 11 is a section on line 10—10 of Figure 10.

Figure 12 is a view in partial elevation of a clutch plate of different construction.

Figure 13 is a section on line 12—12 of Figure 12.

Figure 14 is a view in elevation of a gasket.

Figures 15 to 18 are sectional views taken through the gasket of Figure 14.

In carrying out the invention I employ granulated cork which has been treated or coated by my improved binding composition comprising a synthetic resin and a suitable cork plasticizer which, likewise, is a solvent for the resin. I find that a binding agent comprising a synthetic resin dissolved in a solvent, which solvent has the property of acting as a plasticizer for the cork composition, is highly effective for clutch facings, gaskets and similar automotive products.

Such a composition is described in my said co-pending applications and the synthetic resin and plasticizer composition have been found to impart the necessary resilience, flexibility and tensile strength to the facing and at the same time give an excellent frictional surface. Furthermore, such a binding composition is heat resistant and insoluble in oils and gases, so that a very effective clutch facing is provided.

In Figure 1, I have illustrated a clutch plate 10 of metal which is provided about its periphery with a number of openings 11.

In producing a clutch plate having a facing of my improved material a suitable mold indicated as a whole at 12 is employed and the granular material coated with my improved synthetic resin plasticizer composition is filled into the mold to the desired extent.

In Figure 3, I have illustrated the granular material at 13 and 14 upon opposite sides of the plate 10 and in Figure 4, I have shown the product after it has been subjected to pressure to the desired degree. From the mold 4 the clutch plate and its facing are passed to a suitable oven, where the article is heated until it has set sufficiently for the required purpose. Upon reference to Figure 2, it will be observed that the granular material comprising the clutch facing passes through the openings 11, so that after the article has been molded a substantially continuous integral facing is formed upon both sides of the plate which is connected by the homogeneous portions extending through the openings. In this manner, an integral structure is provided in which the facings are adhesively united to the plate and bonded to each other and anchored to the plate.

It will be understood that the pressure and heat employed will vary in accordance with the product to be made and the particular composition employed. Moreover, the facing may be made of any desired thickness.

While I have indicated the application of pressure as one step and the final heating as a further step, in order to set the binder, it will be understood that these two steps will take place simultaneously with molds capable of this practice.

In some cases, it is desirable to form the facing on one side only as where two metal plates are joined with their metal faces in contact.

The mold described is simply illustrative, as various types of automatic and semi-automatic molds may be used.

In lieu of having a facing upon opposite sides of the plate bonded by reason of the material in the openings 11, I may form radially extending elongated slots 15 in the plate as shown in Figures 5 and 6 which will be spaced apart and which will serve the function of the openings. Such slots may extend to the outer edge of the disc or plate and open into the periphery of the metal insert as shown at 16 in Figures 7 and 8.

Instead of having the slots extend radially, they may extend circumferentially as at 17 in Figure 9, where a plurality of spaced staggered slots are shown.

Furthermore, I may form radially or axially extending recesses in the surfaces of the plate 10 which will be under-cut as shown at 18—19 in Figures 10 and 11 and mold the material to the plate, whereby the facing will be securely held and anchored through the dove-tailed connection with said recesses. Such recesses will be staggered upon opposite sides of the plate as shown and may end short of the inner and outer peripheries of the plate as in Figure 5 or open into the outer periphery of the plate as in Figure 10.

In Figures 12 and 13, the plate 10 is formed with a plurality of closely spaced struck-up portions 20 preferably arranged in staggered relation and extending axially. It is to be noted that the struck-up portions are embedded in the cork composition and that the latter is embedded in the openings 21 of the plate, whereby the facings are anchored to the plate.

I, furthermore, contemplate forming the facing material in strip or sheet form and applying it to the clutch plate under heat and pressure. Such a method can be readily employed either with a clutch plate (1) having openings or slots 11, (2) provided with recesses or grooves, or (3) struck-up projections, since the preformed facing material will have sufficient plasticity to enable it to be forced into the openings or recesses and thereupon finally set by means of heat and pressure.

I have found under careful tests, that the resilient and elastic characteristics of the facing meet the very critical tests for a friction surface and, moreover, the binding composition being substantially inert to lubricating oils and gases such as are met with in a clutching apparatus, the facing has no tendency to disintegrate under the prevailing high temperatures. It is this characteristic of the invention which enables it to have a long life under the trying conditions to which a clutch is subjected.

Furthermore, as stated, the facings are adhesively united to the plate and anchored in the plate.

I propose to employ the various synthetic resins referred to in my aforesaid cases, namely phenol formaldehyde condensation products, urea formaldehyde condensation products and combinations of the same, and substantial equivalents of these may be employed as set forth in said applications.

A hardening agent will be employed in some cases, such as an organic or inorganic acid, for example, oxalic or sulphuric acid, or materials such as hexamethylaminetetramine or formaldehyde may be used.

Instead of using protein I will add to the phenol and/or urea combination, a glyptal resin, i. e., an alkyd produced from phthalic anhydride and glycerine.

For the plasticizers, diethylene and tryethylene glycol, and glycerine are satisfactory and, of course, other equivalent plasticizers which are solvents for the synthetic resins, as well as satisfactory cork plasticizers, may be readily employed.

I will use any of the synthetic resins commercially available such as: phenol resins, urea resins, glyptal or alkyd resins, vinyl resins, or any synthetic resin or combination which will stand up as a binder, and be (1) insoluble in oils and gases, (2) heat resistant, and (3) abrasion resistant, and to which is added an organic plasticizer which will act (a) as a solvent for the resin and (b) also as a plasticizer for the cork composition.

I have also found that the composition facing may be employed in connection with gaskets having a metal insert, such as described in the United States patents to George T. Balfe, Nos. 1,776,140; 1,788,041, and 1,789,030.

The high tensile strength and flexibility of the facing materials when used in a gasket of this character enables an excellent sealing value to be obtained and, moreover, the binder employed will be inert to gases and liquids, notwithstanding the very high temperatures which may prevail.

In Figure 14, I have illustrated a gasket 22 having passage openings 23 and bolt holes 24, and formed of my improved cork composition. This gasket is punched from sheets or blocks of the improved material after the same has been given a set by heat and pressure, or the same may be molded as described above.

In Figure 15, the gasket is similar to that shown in the pending application of George T. Balfe, Serial No. 402,589, and comprises a metal insert 25 of sheet steel having a multiplicity of closely associated projections 26 struck up therefrom throughout the area of the sheet. These projections are embedded in layers 27 of the cork composition and extend through the same. The ends 28 of the projections are bent over, i. e., clenched, to lie exposed within the planes of the outer surfaces of the gasket layers and form substantially smooth sealing surfaces. The projections 25 extending throughout the thickness of the layers 27 and throughout the area of the gasket, form barriers to resist spreading of a break or blow, i. e., the projections act to localize the effect of disruption. Also, the exposed ends of the projections form surface to surface metal heat conduits so as to transfer heat from one surface of the gasket to the other. In this manner, formation of localized areas of high temperature is prevented, and heat is dissipated by the gasket.

The gasket shown in Figure 16 is similar to that of Figure 15, except that the projections are formed as shown in the patent to Balfe, No. 1,776,140.

The gaskets of Figures 17 and 18 are useful in cases such that wear incident to heat, and gas and water pressures are negligible. The projections terminate below the gasket surface and are deformed within the layers.

In some cases, a layer of material 27 is applied to one side only of the insert.

Preferably, the material shown in Figures 15 to 18 is produced by combining the metal insert layer or sheet and the layers or sheets of the cork composition, by passing the layers through a press or roll to compress the layers together and force the projections into the cork composition. In this manner the ends are bent over and embedded to lie exposed in the surface as in Figures 15 and 16 or deformed as in Figures 17 and 18.

The sheets 27 are preferably cured before being combined but in some cases, the curing of the cork composition is accomplished after the composite laminated material is formed. Also, the laminated material of Figures 15 to 18 may be formed by molding as above described.

Preferably, sheets or lengths of the composite laminated material of Figures 14 to 18 is formed and then gaskets or other articles of desired shape are stamped or punched therefrom.

It will, therefore, be seen that the invention contemplates a facing material having a high abrasive and sealing value which would be flexible and resilient and at the same time retain its homogeneous structure at high temperatures and in the presence of liquids and gases which will have no solvent effect.

It is a further feature of this invention that by the use of the binder composition described, the time cycle within which the cork facing can be molded and set is materially lessened. With the present invention, the maximum time for preparing a facing as shown in Figure 1, is twenty-five minutes.

It will be understood that by decreasing or increasing the amount of plasticizers, the cork composition will possess varying qualities. In other words, by using less plasticizer, the facing will be harder and less resilient.

Furthermore, it will be clear that there is no waste of material in that the plasticizer employed acts also as the solvent for the resin.

It is further to be noted that by the use of a granular cork composition in which the granules are coated and impregnated with my improved synthetic resin plasticizer binding agent which is a cork plasticizer, as well as a solvent for the resin, that the cork composition so formed can be molded directly after it has been treated or impregnated with the binder and it is unnecessary to spread out or dry the cork granules to get rid of the solvents used. Heretofore, the solvent such as alcohol or toluol must be eliminated before the cork composition is molded.

It will be understood that the granulated mass, in accordance with my invention, is, of itself, plastic and may, therefore, be spread loosely upon the object to be faced and thereupon set by means of heat and pressure or made into a preformed sheet or strip and then subjected to further pressure and heat to mold and set it upon the base structure.

The binding composition has not only the function of a binding agent in the form of a cork plasticizer and resin solvent, but primarily imparts to the facing flexibility and resilience, providing an excellent abrasion surface, and at the same time of itself is insoluble and inert to gases and liquids at the high temperatures which may be developed under the conditions in which a clutch facing or a gasket are employed.

A further use for the present invention is in the manufacture of brake linings, wherein the material is molded to a brake drum or is applied thereto in the form of a strip and subjected to heat and pressure to cause it to thoroughly adhere to the drum.

It will be understood that by using a binding composition comprising a synthetic resin and a cork plasticizer which is also a solvent for the resin, that a very efficient coating of the granules is provided, whereby the coated or impregnated granular mass may be applied to a backing or plate, as shown in Figures 3 and 4, or preformed and applied thereto, whereupon by the use of heat and pressure a very satisfactory abrading surface will be obtained. With previous compositions of this character, it has always been necessary to treat the material in some manner to remove the resin solvent, whereas with the present invention the solvent is itself the cork plasticizer, as well as exerts a solvent action on the resin. This is very vital, since the full value of the plasticizer is obtained without any expensive additional treatment and the cork granules are thoroughly coated and impregnated.

It will be observed that the cork composition, while primarily useful as a facing for the metal cores of clutch plates, it is also useful as a facing for gaskets employing a metal insert. In this connection the cork composition can be employed in sheet form without such backing or insert. In such cases, as described herein, the plastic composition is rolled or molded to sheet or block form and then cured and hardened as desired. The blocks may be cut into strips of suitable size and the sheet material will find numerous applications. For example, it may be punched or stamped to obtain articles of any required design.

I claim:—

As an article of manufacture, a clutch plate having a plate member provided with openings therein, and flexible and resilient facing layers united to opposite sides of said plate member and comprising a cork composition, portions of which extend through said openings to unite the facing layers and anchor the same in the plate, the granules of the composition being bonded together and to the plate by a synthetic resin and a plasticizer therefor and for the composition, said plasticizer being a solvent for the synthetic resin.

ANDREW WEISENBURG.